United States Patent
Hegner

(10) Patent No.: US 9,840,964 B2
(45) Date of Patent: Dec. 12, 2017

(54) SUPERCHARGING UNIT FOR AN INTERNAL COMBUSTION ENGINE, AND INTERNAL COMBUSTION ENGINE

(71) Applicant: MTU Friedrichshafen GmbH, Friedrichshafen (DE)

(72) Inventor: Ronald Hegner, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 260 days.

(21) Appl. No.: 14/692,198

(22) Filed: Apr. 21, 2015

(65) Prior Publication Data

US 2015/0226109 A1 Aug. 13, 2015

Related U.S. Application Data

(63) Continuation of application No. PCT/EP2013/003183, filed on Oct. 22, 2013.

(30) Foreign Application Priority Data

Oct. 26, 2012 (DE) ........................ 10 2012 021 844

(51) Int. Cl.
*F02B 33/44* (2006.01)
*F02B 37/013* (2006.01)
(Continued)

(52) U.S. Cl.
CPC .......... *F02B 37/013* (2013.01); *F02B 37/004* (2013.01); *F02B 37/10* (2013.01);
(Continued)

(58) Field of Classification Search
CPC ...... F02B 37/013; F02B 37/004; F02B 37/10; F02B 37/18; F02B 39/04; F02B 39/10; F02B 39/12
(Continued)

(56) References Cited

U.S. PATENT DOCUMENTS

| | | | |
|---|---|---|---|
| 4,400,945 A | 8/1983 | Deutschmann et al. | |
| 6,655,142 B2 | 12/2003 | Callas et al. | |

(Continued)

FOREIGN PATENT DOCUMENTS

| | | |
|---|---|---|
| DE | 27 52 988 A1 | 6/1978 |
| DE | 10 2011 005 825 A1 | 9/2012 |
| EP | 2 042 705 A1 | 4/2009 |

OTHER PUBLICATIONS

International Search Report dated Jan. 23, 2014 for International Application No. PCT/EP2013/003183 (2 pages).

*Primary Examiner* — Ngoc T Nguyen
(74) *Attorney, Agent, or Firm* — Taylor IP, P.C.

(57) ABSTRACT

A supercharging unit for an internal combustion engine has a high-pressure turbine which drives a high-pressure compressor so as to perform a rotational movement about a first axis and through which exhaust gas of the internal combustion engine flows, and having a low-pressure turbine which drives a low-pressure compressor so as to perform a rotational movement about a second axis and through which exhaust gas flows. The high-pressure turbine is arranged rotationally conjointly on a first shaft, and the high-pressure compressor is arranged rotationally conjointly on a second shaft, wherein the first and the second shaft are arranged parallel to one another and are arranged offset with respect to one another, wherein the first and the second shaft are mechanically operatively connected to one another such that the high-pressure compressor can be driven by the high-pressure turbine.

15 Claims, 1 Drawing Sheet

(51) Int. Cl.
  *F02B 37/00*   (2006.01)
  *F02B 37/18*   (2006.01)
  *F02B 39/04*   (2006.01)
  *F02B 39/10*   (2006.01)
  *F02B 37/10*   (2006.01)

(52) U.S. Cl.
  CPC ............. *F02B 37/18* (2013.01); *F02B 39/04* (2013.01); *F02B 39/10* (2013.01); *Y02T 10/144* (2013.01)

(58) Field of Classification Search
  USPC ................... 60/612, 607, 602, 608; 123/562
  See application file for complete search history.

(56) References Cited

U.S. PATENT DOCUMENTS

| | | |
|---|---|---|
| 8,388,302 B2 | 3/2013 | Anderson et al. |
| 2002/0056444 A1 | 5/2002 | Chou et al. |
| 2006/0042247 A1* | 3/2006 | Haugen ................. F02B 37/001 60/612 |
| 2009/0060719 A1 | 3/2009 | Haugen |
| 2009/0249786 A1* | 10/2009 | Garrett ................. F02B 37/007 60/612 |
| 2010/0061843 A1 | 3/2010 | Anderson et al. |
| 2012/0285177 A1* | 11/2012 | Swenson ............... F02B 37/004 60/805 |

* cited by examiner

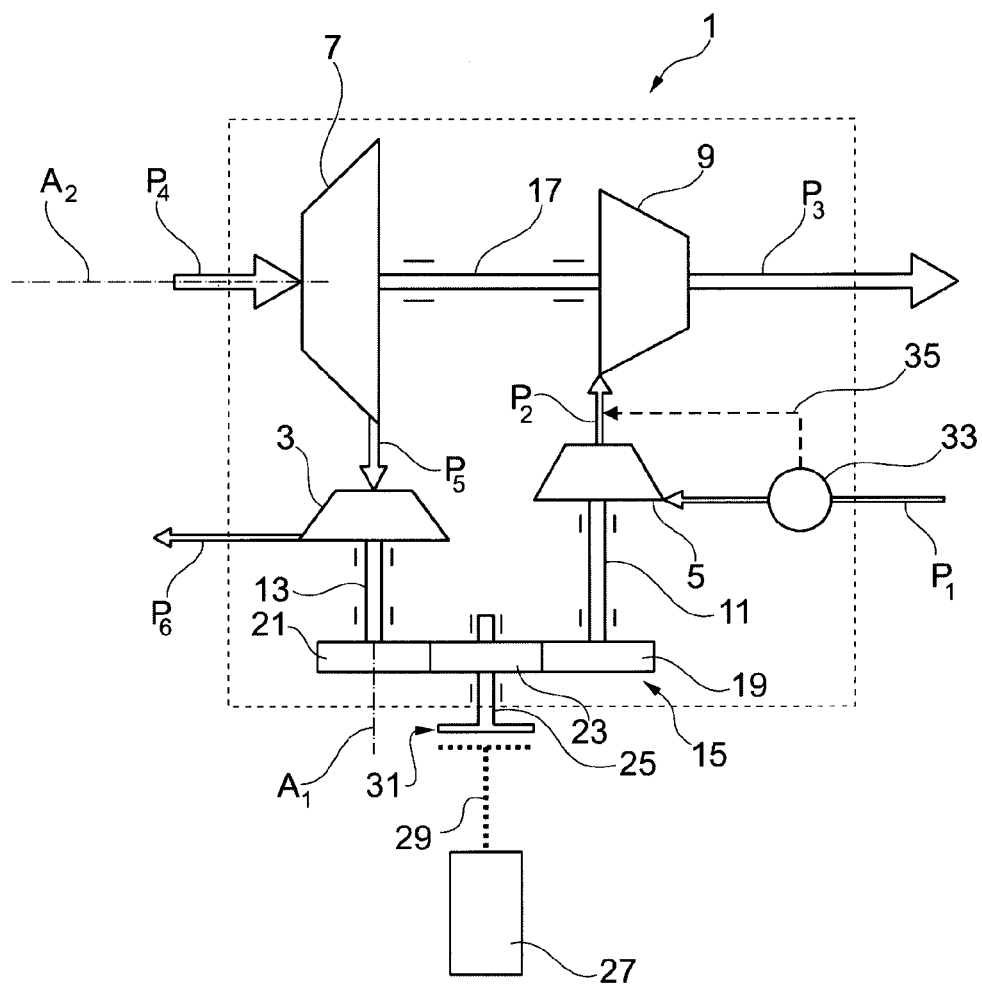

SUPERCHARGING UNIT FOR AN INTERNAL COMBUSTION ENGINE, AND INTERNAL COMBUSTION ENGINE

CROSS REFERENCE TO RELATED APPLICATIONS

This is a continuation of PCT application No. PCT/EP2013/003183, entitled "SUPERCHARGING UNIT FOR AN INTERNAL COMBUSTION ENGINE, AND INTERNAL COMBUSTION ENGINE", filed Oct. 22, 2013, which is incorporated herein by reference.

BACKGROUND OF THE INVENTION

1. Field of the Invention

The current invention relates to internal combustion engines, and, more particularly, to a supercharging unit for use with an internal combustion engine.

2. Description of the Related Art

Supercharging units for combustion engines and for combustion engines of the type specified here are known in the current state of the art. Such a supercharging unit is driven by exhaust gas flowing from the internal combustion engine and serves to compress the charging air supplied to the internal combustion engine. Two-stage supercharging units which include a high pressure and a low pressure component serve to increase the efficiency of compression and to better utilize the exhaust gas energy. A supercharging unit for an internal combustion engine is known from German patent application DE 27 52 988 A1 which features a high pressure turbine through which exhaust gas from the internal combustion engine flows and which drives a high pressure compressor causing rotational movement around a first axis. It moreover includes a low pressure turbine through which also exhaust gas flows, wherein the low pressure turbine drives a low pressure compressor for rotational movement around a second axis. The high pressure turbine and the high pressure compressor are arranged on a common shaft whose rotational axis defines the first axis. The low pressure turbine and the low pressure compressor are arranged on a second shaft whose rotational axis defines the second axis. The first and the second axis are arranged perpendicular relative to each other. Exhaust gas from the internal combustion engine flows first through the high pressure turbine and from there—viewed in flow direction—comes to the low pressure turbine. Charging air for the internal combustion engine is initially compressed by the low pressure compressor and is then supplied to the high pressure compressor for further compression. It has been shown that this arrangement requires a comparatively large space whereby also the fluidic arrangement of the two turbines and compressors relative to each other is also not ideal.

SUMMARY OF THE INVENTION

The current invention provides a supercharging unit and an internal combustion engine wherein the supercharging unit features an especially compact design and an especially favorable fluidic arrangement of the series connection of the high pressure and low pressure turbines as well as of the low pressure and high pressure compressors.

The supercharging unit has a high pressure turbine that is arranged rotationally conjointly on a first shaft. The high pressure compressor is arranged rotationally conjointly on a second shaft wherein the first and the second shaft are arranged parallel to each other and viewed in a direction perpendicular to their longitudinal axes—are arranged offset relative to each other. The first and the second shaft preferably are mechanically operatively connected so that the high pressure compressor can be driven by the high pressure turbine. Instead of one common shaft two different shafts are therefore provided for the high pressure turbine on the one hand and for the high pressure compressor on the other; the shafts being arranged parallel to each other and offset relative to each other. This shortens the physical length of the high pressure component of the supercharging unit compared to the arrangement of high pressure turbine and high pressure compressor on one common shaft. The high pressure turbine and the high pressure compressor can be arranged especially compact relative to the low pressure component consisting of the low pressure turbine and the low pressure compressor. This also makes it possible in particular, to design the fluidic arrangement from the high pressure turbine to the low pressure turbine on the one hand and from the low pressure compressor to the high pressure compressor on the other hand more favorably than has been known. The preferably mechanical operative connection of the first shaft with the second shaft ensures that the high pressure compressor can be driven by the high pressure turbine.

A supercharging unit may be characterized in that the first and the second axis are arranged at an angle relative to each other of at least 80° to 120° at most. They are arranged preferably at an angle of 90° relative to each other.

The second axis around which the low pressure compressor is rotatable is arranged perpendicular on the first shaft as well as on the second shaft, whereby the axis of rotation of the second shaft defines the first axis. The arrangement of the high pressure component and the low pressure component of the supercharging unit can thereby be arranged to be especially compact whereby the low pressure compressor and the low pressure turbine can be arranged virtually transversely to the high pressure compressor on the one hand and the high pressure turbine on the other hand. The fluidic connection between the components is hereby also improved.

A supercharging unit may also be characterized in that the low pressure compressor and the low pressure turbine are mounted rotationally conjointly on a common third shaft. In this case, the axis of rotation of the third shaft defines the second axis. The third shaft is arranged preferably transversely above the first shaft on the one hand and above the second shaft on the other hand, thus providing an arrangement that is especially compact and fluidically favorable.

A supercharging unit may also be characterized in that the first and the second shaft are mechanically operatively connected through a gear drive. It is hereby possible that the first shaft comprises a first gear which is arranged rotationally conjointly upon same, wherein the second shaft comprises a second gear arranged rotationally conjointly on it and wherein the first gear interacts directly with the second gear. In this manner an especially simple mechanical operative connection is provided between the high pressure turbine and the high pressure compressor. The first and the second gear can have the same diameter or different diameters. If they have different diameters, a step-up or gear reduction can be realized between the high pressure turbine and the high pressure compressor. Alternatively it is possible that at least one third gear is arranged between the first gear and the second gear. In particular it is possible that a gear box comprising at least two additional gears is arranged between the first and the second gear. In such a design sample it is also possible to realize a step-up or gear reduction between the first and the second gear. It is moreover possible to mechanically support the high pressure turbine by introduction of a drive torque into the gear box, thereby providing additional drive to the high pressure compressor.

In an alternative design example it is also possible that the first and the second shaft are operatively connected by way of a so-called autosyn. By way of the first shaft, the high pressure turbine thereby drives a generator which produces electric current which is used to drive an electric motor whose drive represents the second shaft or is operatively connected with the second shaft, so that the high pressure compressor can be driven by the electric motor. This design example provides an even more flexible arrangement of the high pressure turbine and the high pressure compressor relative to each other.

A supercharging unit may also be characterized in that the gear drive includes a first gear arranged rotationally conjointly on the first shaft; a second gear arranged rotationally conjointly on the second shaft; and at least one third gear. The first gear is operatively connected with the second gear through the at least one third gear. The third gear may be mounted rotationally conjointly on a fourth shaft. It is hereby possible that the first, the second and the third gear have the same or different diameters. It is also possible that respectively two gears have the same diameter, and the remaining gear has a deviating diameter. A step-up or gear reduction can thus be realized between the high pressure turbine and the high pressure compressor. In any event, the high pressure compressor, enabled by the gear drive consisting of the first, the second and the third gear can be driven by the high pressure turbine.

A supercharging unit may also be characterized by a drive unit which can be operatively connected with the fourth shaft. This enables a drive torque from the drive unit to be introduced into the gear drive, namely into the third gear. The high pressure turbine can thus be mechanically supported, or respectively the high pressure compressor can be driven by the drive unit, in particular supportively, in addition or possibly alternatively to the drive provided by the high pressure turbine. This is provided in particular to bridge a so-called turbo-lag at low rotational speeds of the internal combustion engine when a sufficient exhaust flow is not yet available to efficiently drive the high pressure compressor. In particular in the low speeds range of the internal combustion engine it is possible that the high pressure compressor is driven almost exclusively or exclusively by the drive unit, whereas the high pressure turbine is virtually inoperative due to insufficient exhaust flow.

Also, a supercharging unit may also be characterized in that the drive unit includes one drive shaft which can be brought into operative connection with the fourth shaft with the assistance of a clutch. It is thereby possible to connect the drive unit when needed and to disconnect it mechanically from the fourth shaft if it is not needed. This avoids in particular that the drive unit has to be dragged along in certain functional states by the high pressure turbine, in particular when a sufficient exhaust flow is available so that additional support by way of a drive unit is not required. It is thereby avoided that output released from the high pressure turbine is diverted to drag along the drive unit. Rather, the full driving power of the high pressure turbine is available to the high pressure compressor if the drive unit is mechanically separated from the fourth shaft with the assistance of the clutch.

A supercharging unit may also be characterized in that the drive unit is in the embodiment of an electric motor. This is advantageous since in this case no mechanical operative connection with the internal combustion engine is required so that the drive unit can be positioned with greater flexibility and can be controlled with greater flexibility.

A supercharging unit may also be characterized by a valve by way of which a flow path for the exhaust gas can be opened, through which the exhaust gas can flow from the internal combustion engine to the low pressure turbine. The flow path passes by the high pressure turbine and is therefore designed as a high pressure turbine bypass. The flow path can also be closed through a valve. In one design example the valve displays two states, whereby the flow path can be opened in one open state of the valve and can be closed in one closed state of the valve. If the flow path is closed the entire exhaust gas that is released from the internal combustion engine flows through the high pressure turbine and from it further to the low pressure turbine. If however the flow path is open, at least part of the exhaust gas coming from the internal combustion engine flows through the flow path past the high pressure turbine and directly to the low pressure turbine. Depending on the operating point of the internal combustion engine it is therefore possible to vary the compression output of the supercharging unit in that either the flow is directed to both turbines in series, or in that the high pressure turbine is bypassed at least partially. A lower compression output is thereby available in the supercharging unit if the high pressure turbine is bypassed at least partially.

In one example the valve is adjustable, whereby it can assume at least one discrete intermediate stage between the closed state and the open state. It may be continuously cross sectionally variable in regard to its throughput between these stages. In this case the compression output of the supercharging unit can be adapted especially flexibly to the operating point of the internal combustion engine. The valve is preferably controlled through a motor control unit, dependent upon the operating point of the internal combustion engine, so that the compression output of the supercharging unit is adjustable through the motor control unit. A controlled two-stage charge is thus realized.

According to an another design of the current invention a drive unit for generating a torque is provided which can be operatively connected with the second shaft so that the high pressure compressor can be driven by way of the torque produced by the drive unit. The high pressure compressor can thus be advantageously driven and accelerated, alternatively or in addition to the high pressure turbine. This provides improved response characteristics of the supercharging unit. This is advantageous, especially if the available exhaust gas flow is not yet sufficient to power the high pressure turbine sufficiently.

In an additional design variation of the invention the high pressure compressor and the low pressure compressor are arranged relative to each other so that a straight flow path for charging air is created between them. Thus, a compact arrangement of the supercharging unit is advantageously provided. Moreover, a supply flow of charging air is provided without redirection and especially low pressure losses.

The high pressure turbine and the low pressure turbine can be arranged relative to each other so that a straight flow path for exhaust gas is created between them. This advantageously ensures a particularly compact arrangement of the supercharging unit.

Moreover, a supply flow of exhaust gas is provided without redirection and especially low pressure losses.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

The sole FIGURE shown in FIG. 1 is a schematic illustration of a design example of a supercharging unit of the present invention.

Corresponding reference characters indicate corresponding parts throughout the several views. The exemplification set out herein illustrates an embodiment of the invention and such exemplification is not to be construed as limiting the scope of the invention in any manner.

DETAILED DESCRIPTION OF THE INVENTION

FIG. 1 is a schematic illustration of a supercharging unit 1 which includes a high pressure compressor 3 which can be driven by a high pressure turbine 5 to perform a rotational movement around a first axis $A_1$.

Moreover, a low pressure compressor 7 is provided which can be driven by a low pressure turbine 9 to perform a rotational movement around a second axis $A_2$.

Exhaust gas flowing from an internal combustion engine which is not illustrated here—as illustrated by an arrow $P_1$—is first supplied to high pressure turbine 5 through which it flows, thereby powering high pressure turbine 5. From there is directed on, along a path $P_2$ and is supplied to low pressure turbine 9 through which it flows, thereby powering it. From there it flows—as illustrated schematically by an arrow $P_3$—to an exhaust gas system which is not illustrated and not discussed here in further detail. High pressure turbine 5 and low pressure turbine 9 are therefore series connected, viewed in flow direction of the exhaust gas.

Charging air for the internal combustion engine flows initially—as schematically indicated by an arrow $P_4$—into low pressure compressor 7 where it is compressed in a first stage. Arrow $P_5$ illustrates schematically that the pre-compressed charging air flows on from low pressure compressor 7 to high pressure compressor 3. There, it is further compressed in a second stage and finally—as illustrated schematically by arrow $P_6$—is directed to the internal combustion engine.

Overall, the energy of the exhaust gas flow is being utilized in an already known manner in order to compress the charging air for the internal combustion engine.

High pressure turbine 5 is arranged rotationally conjointly on a first shaft 11. High pressure compressor 3 is arranged rotationally conjointly on a second shaft 13. In the illustrated design example, first shaft 11 and second shaft 13 are mechanically operatively connected with each other through a gear drive 15. If therefore exhaust gas flows through high pressure turbine 5, first shaft 11 will be driven and in turn then drives second shaft 13 via gear drive 15, so that high pressure compressor 3 is thereby also being driven.

It is shown that first shaft 11 and second shaft 13 are aligned parallel relative to each other. Each have a longitudinal axis whereby in this case the longitudinal axis of second shaft 13 coincides with first axis $A_1$. It is shown that shafts 11, 13—viewed in a direction perpendicular to their longitudinal axes—are arranged offset to one another.

Low pressure compressor 7 and low pressure turbine 9 are mounted rotationally conjointly on a common third shaft 17. They are therefore directly mechanically operatively connected with each other through third shaft 17, so that low pressure compressor 7 is driven to a rotational movement when exhaust gas flows through low pressure turbine 9 and moves low pressure turbine 9 to perform a rotational movement about second axis $A_2$. Third shaft 17 includes a rotational axis which in this case coincides with second axis $A_2$.

It is shown that first axis $A_1$ and second axis $A_2$ in the illustrated design example are arranged perpendicular relative to each other. Therefore, third shaft 17 on the one hand and first and second shafts 11, 13 on the other hand are also arranged perpendicular relative to each other. Third shaft 17 is thereby arranged virtually transversely above first shaft 11 and second shaft 13, wherein low pressure compressor 7 is arranged above high pressure compressor 3, and whereby moreover low pressure turbine 9 is arranged above high pressure turbine 5.

In this case the term "above" relates to the illustration according to the drawing. It is obviously possible that in a specific implementation low pressure compressor 7—viewed in vertical direction—is arranged above high pressure compressor 3 whereby moreover low pressure turbine 9 is arranged above high pressure turbine 5. In another design example it is however also possible that low pressure compressor 7 is arranged beside high pressure compressor 3, whereby low pressure turbine 9 is arranged beside high pressure turbine 5. Also an arrangement offset in two directions—viewed in the direction of one axis which is positioned perpendicular in the image plane of the drawing and in the image plane as illustrated in the drawing—between low pressure compressor 7 and low pressure turbine 9, on the one hand and high pressure compressor 3 and high pressure turbine 5 on the other hand is possible. The illustration according to the only drawing therefore is consistent preferably with a projection onto the image plane, whereby charging unit 1 is depicted from the side or in another design example preferably from the top or also from the bottom.

The arrangement according to FIG. 1 can be favorable, because the resulting positioning of shafts 11, 13, 17 as well as that of gear drive 15 along the four sides of a rectangle allows for an especially compact, nested arrangement of charging unit 1. Moreover, the flow paths between high pressure turbine 5 and low pressure turbine 9 on the one hand, and between low pressure compressor 7 and high pressure compressor 3 on the other hand are being shortened and are arranged especially simply without superfluous redirections and with low pressure losses.

Gear drive 15 includes a first gear 19 which is arranged rotationally conjointly on first shaft 11, a second gear 21 which is arranged rotationally conjointly on second shaft 13, and a third gear 23. First gear 19 is thereby in operative connection with second gear 21, enabled by third gear 23. First gear 19 thereby interacts with third gear 23 so that same is rotationally driven when high pressure turbine 5 is driven by exhaust gas. Third gear 23 in turn interacts with second gear 21, so that second gear 21 is driven when third gear 23 is driven. In the design example illustrated in the drawing gears 19, 21, 23 are depicted in the same size, so that in this respect a 1:1 conversion of the rotational movement of the high pressure turbine into a rotational movement of the high pressure compressor occurs. It is possible to vary the diameters of gears 19, 21, 23 relative to each other, in order to implement a step-up or gear reduction between the rotational movement of high pressure turbine 5 on the one hand and high pressure compressor 3 on the other hand.

It is also possible in one design example that first gear 19 interacts directly with second gear 21 without a third gear 23 being provided. It is also possible that in one design example more than one third gear 23 is provided, wherein in particular a gearbox can be provided between first gear 19 and second gear 21.

Third gear 23 is hereby arranged rotationally conjointly on a fourth shaft 25.

A drive unit 27 is provided which may be in the embodiment of an electric motor and which includes a drive shaft 29. This can be brought into operative connectivity with fourth shaft 25 via a clutch 31. It is therein possible to introduce an additional torque, generated by drive unit 27 into gear drive 15 and in particular into third gear 23 in order to support high pressure turbine 5 or respectively to drive high pressure compressor 3. This is especially preferred for bridging a turbo-lag at low rotational speeds of the internal combustion engine.

It is provided that drive unit 27 and preferably also clutch 21 are controllable through a motor controller, so that drive unit 27 can be activated and be operationally connected via clutch 31 with gear 15 when the internal combustion engine reaches an operating point at which additional drive power should be introduced into gear drive 15. Vice versa it is possible that clutch 31 is opened in particular through the motor controller, whereby at the same time preferably drive unit 27 is deactivated, when the internal combustion engine reaches an operating point at which no additional drive power should be introduced into gear drive 15. If the mechanical operative connection between fourth shaft 25 and drive unit 27 is then disengaged via clutch 31 it need not be dragged along by high pressure turbine 5, but instead the drive power provided by it can rather be supplied completely to high pressure compressor 3.

Charging unit 1 can also include a valve 33 which can also be controlled by a motor controller in order to open or close a flow path 35 or respectively preferably vary it relative to a throughput cross section, whereby high pressure turbine 5 can be bypassed via flow path 35. Valve 33 is also referred to as a so-called turbine-bypass. Depending on an operating point of the internal combustion engine the entire exhaust gas stream can therefore preferably be supplied to high pressure turbine 5 and subsequently to low pressure turbine 9; or at least part of the exhaust gas stream or also the entire exhaust gas stream can be branched off through valve 33 into flow path 35 and can be routed directly to low pressure turbine 9 by bypassing high pressure turbine 5. Dependent on the operating point it is therefore possible to preferably continuously vary the compression output of charging unit 1.

Overall it has been demonstrated that with a charging unit 1 and the internal combustion engine a compact, fluidic favorable arrangement of a high pressure and a low pressure turbine as well as of a low pressure and a high pressure compressor relative to each other is possible so that in regard to the internal combustion engine space can be saved and at the same time efficient charging can be ensured.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A supercharging unit for an internal combustion engine, comprising:

a high pressure turbine which drives a high pressure compressor to perform a rotational movement about a first axis and through which exhaust gas of the internal combustion engine flows; and a low pressure turbine which drives a low pressure compressor to perform a rotational movement about a second axis and through which exhaust gas flows;

wherein the high pressure turbine is arranged on a first shaft having a first longitudinal axis, and the high pressure compressor is arranged on a second shaft having a second longitudinal axis, the first shaft and the second shaft being arranged parallel relative to each other and, viewed in a direction perpendicular to the longitudinal axes of said first shaft and said second shaft, are arranged offset with respect to one another, the first shaft and the second shaft being mechanically operatively connected to one another so that the high pressure compressor can be driven by the high pressure turbine.

2. The supercharging unit according to claim 1, wherein the first axis and the second axis are arranged at an angle relative to each other of between 80° and 20°.

3. The supercharging unit according to claim 2, wherein the first axis and the second axis are arranged at an angle relative to each other of approximately 90°.

4. The supercharging unit according claim 1, wherein the low pressure compressor and the low pressure turbine are mounted rotationally conjointly on a common third shaft.

5. The supercharging unit according to claim 1, wherein the first shaft and the second shaft are mechanically operatively connected through a gear drive.

6. The supercharging unit according to claim 5, wherein the gear drive includes a first gear arranged on the first shaft; a second gear arranged on the second shaft; and at least one third gear, wherein the first gear is operatively connected with the second gear through the at least one third gear, and wherein the third gear is mounted on a fourth shaft.

7. The supercharging unit according to claim 6, wherein a drive unit can be operatively connected with the fourth shaft for enabling a drive torque from the drive unit to be introduced into the gear drive.

8. The supercharging unit according to claim 7, wherein the drive unit is configured as an electric motor.

9. The supercharging unit according to claim 7, wherein the drive unit includes a drive shaft which can be brought into operative connection with the fourth shaft with the assistance of a clutch.

10. The supercharging unit according to claim 9, wherein the drive unit is configured as an electric motor.

11. The supercharging unit according to claim 1, further including a valve configured for allowing a flow path for the exhaust gas flowing from the internal combustion engine to the low pressure turbine to be opened, thereby allowing exhaust gas to at least partially bypass the high pressure turbine.

12. The supercharging unit according to claim 11, wherein the valve is an adjustable valve.

13. The supercharging unit according to claim 1, further including a drive unit for generating a torque which can be operatively connected with the second shaft so that the high pressure compressor can be driven using the torque produced by the drive unit.

14. The supercharging unit according to claim 1, wherein the high pressure compressor and the low pressure compressor are arranged relative to each other so that a straight flow path for charging air is created therebetween.

15. The supercharging unit according to claim 1, wherein the high pressure turbine and the low pressure turbine are arranged relative to each other so that a straight flow path for exhaust gas is created therebetween.

* * * * *